United States Patent Office 3,321,271
Patented May 23, 1967

3,321,271
SYNTHESIS OF ALUMINUM SILICATE WHISKERS
Robert C. Johnson, Norris, and Wilbur H. Warwick, Andersonville, Tenn., assignors to the United States of America as represented by the Secretary of the Interior
No Drawing. Filed Feb. 2, 1965, Ser. No. 429,930
4 Claims. (Cl. 23—110)

The invention herein described and claimed may be manufactured and used by or for the Government of the United States of America for governmental purposes without the payment of royalties thereon or therefor.

This invention is concerned with preparation of aluminum silicate whiskers.

Whiskers of aluminum silicate are highly refractory, elastic, strong, thin single crystals which are useful in many applications such as reinforcement of ablative composites, as felted insulating pads, boards and paper, as loose fill thermal insulation, etc. Previous attempts to prepare these whiskers have not yielded products of desirable length and fineness.

It has now been found that long, fine whiskers of aluminum silicate may be produced by reaction of aluminum halide in the vapor state with water vapor and silica or aluminum silicate in essentially non-whisker form.

Aluminum fluoride has been found to be particularly effective and convenient in preparation of the aluminum silicate whiskers of the invention. The reaction is most conveniently carried out by vaporizing aluminum fluoride at a temperature in the range 1000° to 1400° C., allowing or forcing (by means of carrier gas) this vapor to enter an adjacent reaction chamber (maintained at the same temperature) which contains a solid silica-containing substrate (preferably aluminum-silicate and may be the chamber wall) and which is being supplied with water vapor from the furnace atmosphere or by means of a carrier gas. The $AlF_3$ vapor, water vapor and silica from the substrate react to form aluminum silicate whiskers on the substrate. Alternately the silica may be mixed initially in powder form with the $AlF_3$, in which case, the aluminum silicate whiskers grow outward from the surface of this mixture which acts as a growth substrate.

The reaction mechanism involved in formation of the products of the invention is not known with certainty. Most probably, however, the $SiO_2$ is altered by reaction with $AlF_3$ or HF (from hydrolysis of $AlF_3$) to form $SiOF_2$ or $SiF_4$ which have high vapor pressures at operating temperatures, and after moving as a vapor to the whisker growth site is reoxidized by reaction with $H_2O$.

Water vapor may be supplied by the furnace atmosphere, or additional water vapor may be added to the reaction site as necessary by passing a carrier gas, such as $N_2$, over liquid water and then into the furnace. The reaction may be carried out in any conventional furnace capable of maintaining the required temperature and atmosphere. An electric furnace with silicon carbide resistors was used in the examples below.

Optimum time and temperature in the process of the invention may vary over a considerable range and are best determined experimentally. The temperature must, of course, be sufficient to volatilize the $AlF_3$ and cause the reaction with the $SiO_2$. A range of about 1000° to 1400° C. has generally been found satisfactory.

Periods of time varying from about ½ to 36 hours are satisfactory. The highest rate of whisker growth generally occurs in the first 3 hours of firing.

Although the use of solid $AlF_3$ has been found to give good results and is convenient, the invention is not limited to this compound by a source of $Al^{+++}$. $AlCl_3$ or $AlBr_3$ may be substituted for $AlF_3$ if they are added to the reaction chamber as vapors. This requires the use of vapor generators (outside the furnace) since $AlCl_3$ and $AlBr_3$ vapor pressures are higher at lower temperatures than is that of $AlF_3$. Accordingly, if they are heated with $SiO_2$ or in an aluminum silicate reaction vessel, they would either volatilize or hydrolyze at low temperatures before the proper reaction temperature was reached. Use of $AlCl_3$ or $AlBr_3$ would, however, have the advantages that specific rates of vapor introduction to the reaction zone could be maintained by use of external generators and generators (outside the furnace) since $AlCl_3$ and $AlBr_3$ stead of the more dangerous HF resulting from the use of $AlF_3$. $AlF_3$ may also be generated outside the reaction vessel and introduced to the hot reaction chamber in controlled concentrations and at controlled rates.

The mole ratio of aluminum halide to silica and water vapor is not critical and optimum values may vary considerably with different reactants and reactant conditions. A range of mole ratios of the three reactants of from about 5–10–6 to 1–.1–<.1 has been found satisfactory, particularly when the aluminum halide is the fluoride.

The invention will be more specifically illustrated by the following examples.

Example 1

Batch materials: Grams used
1.0 $AlF_3$ ---------------------------------- 16.8
0.1 $SiO_2$ ---------------------------------- 1.2

Procedure.—A 30 ml. platinum crucible inside a 100 ml. capacity platinum crucible held the raw materials. A lid was placed loosely on the small crucible to inhibit permature hydrolysis of the $AlF_3$, but a lid was not used on the large crucible. Atmospheric water was expected to hydrolyze the vapors emanating from the small crucible. The crucible and contents were heated to 1200° C. and held there for 1 hour. They were then allowed to cool to room temperature.

Observation.—In addition to very fine whiskers and coarse rods of $Al_2O_3 \cdot XSiO_2$, dendritic $AlF_3$ crystal growths were noted on the surface of the raw materials. The presence of recrystallized $AlF_3$ indicated insufficient atmospheric water for complete hydrolysis.

Example 2

Batch materials: Grams used
$AlF_3$ ---------------------------------- 300
$SiO_2$ supplied by reaction chamber wall (fireclay)

Procedure.—The apparatus used in this example consisted of a 400 cc. platinum dish, for holding the solid raw material ($AlF_3$), which was placed in the bottom of a 2000 cc. capacity fireclay crucible which served as the reaction chamber and as a source of $SiO_2$ for whisker growth. The crucible was closed by means of a lid, also of fireclay, having an exhaust hole in the center thereof. The crucible also contained a flat, ½ inch thick, fireclay partition between the crucible lid and the platinum dish, just above the latter. This partition also had an exhaust hole in the center and served to permit the passage of $AlF_3$ vapor into the reaction chamber above.

The crucible was contained in an electric furnace with silicon carbide resistors which served to heat the solid raw material and reaction chamber. The furnace and reaction chamber were also supplied with a refractory ($Al_2O_3$) tube for supplying the reaction chamber with a flow of carrier gas ($N_2$) containing water vapor, the water vapor being supplied by passing the carrier gas over liquid water (heated or otherwise) in a flask outside the furnace.

The maximum firing temperature was 1190° C. The $N_2$ carrier gas was turned on when the furnace reached 1150° C. A flow rate of 3 liters per minute was used for about 30 minutes. The water was not heated. The furnace was cut off when 1190° C. was reached.

*Results.*—The lower one-half of the inside wall of the reaction chamber was covered with short $Al_2O_3 \cdot XSiO_2$ whiskers. The whiskers were recovered by lightly scraping them from the chamber wall. Chemical analysis of the whiskers showed 16.7 percent $SiO_2$.

*Example 3*

*Batch.*—Same as Example 2.

*Procedure.*—The apparatus of Example 2 was again used in this experiment. The maximum temperature used was 1300° C. and was held for 6½ hours. When the furnace temperaure reached 1250° C. the $N_2$ carrier gas was turned on at 3 liters per minute flow. The water was heated by a hot plate and the water temperature ranged between 57° C. and 70° C. during the experiment. A total of 47 ml. of water was vaporized and carried into the reaction chamber by the $N_2$ gas. The gas flow was cut off when the furnace was cut off.

*Results.*—$Al_2O_3 \cdot XSiO_2$ whiskers covered the wall of the fireclay reaction chamber. The quantity of whiskers on the wall decreased upward. Granular or platy $Al_2O_3$ crystals grew where whiskers were scarce or absent. This observation was correlated with depth of growth substrate (fireclay chamber wall) penetration by either $AlF_3$ or HF. The heaviest whisker growth occurred where the wall was penetrated the deepest. Obviously the penetrating gas reacted with $SiO_2$ in the wall to produce a more volatile Si-containing compound which then could move to the growing whisker and be included after hydrolysis in the whisker structure. The granular and platy $Al_2O_3$ crystals were most abundant on surfaces not penetrated by the $AlF_3$ or HF vapors.

*Example 4*

All conditions were the same as in Example 3 except the maximum temperature was 1200° C. and was held for one hour.

*Results.*—An excellent volume of fine whiskers was formed. Chemical analysis of the whiskers showed them to be 63.13 percent $Al_2O_3$ and 35.8 percent $SiO_2$. The whiskers varied in length from <.1 mm. to about 1 cm. The whisker widths (measured from electron micrographs) varied from .06 to 9.2 microns. The average width was .99 micron.

*Example 5*

All conditions were the same as Example 3 except that three ¾″ diameter pellets of each of the following compositions, in moles, were pressed and placed on top of the aluminum silicate partition. Also 116 ml. of $H_2O$ was consumed rather than the 47 ml. used in Example 3.

Pellets No. 1—$SiO_2$
Pellets No. 2—$1.0\ SiO_2 + 1.0\ Al_2O_3$
Pellets No. 3—$.5\ SiO_2 + 1.0\ Al_2O_3$
Pellets No. 4—$.1\ SiO_2 + 1.0\ Al_2O_3$

*Results.*—All of the exposed pellet surfaces as well as the aluminum silicate crucible walls and partitions were covered with whiskers. The size of the whiskers decreased with decreasing $SiO_2$ content in the pellet substrates. The average lengths and widths of whiskers grown on the $SiO_2$ and $.1\ SiO_2 \cdot Al_2O_3$ pellets were respectively 1.45 mm. x .0004 mm. and .0037 mm. x .00081 mm.

What is claimed is:

1. A process for preparation of aluminum silicate whiskers comprising reacting an aluminum halide in the vapor state with water vapor and a silica material from the group consisting of silica and aluminum silicate, the reaction being carried out at a temperaure of from about 1000° C. to about 1400° C.

2. The process of claim 1 in which the aluminum halide is aluminum fluoride.

3. The process of claim 1 in which the silica material is silica.

4. The process of claim 1 in which the silica material is aluminum silicate.

References Cited by the Examiner

UNITED STATES PATENTS 3,080,242   3/1963   Berry _____ 23—59 X

OTHER REFERENCES

Chem. Abstracts, 52:19789f, Gelsdorf et al. (1958).

OSCAR R. VERTIZ, *Primary Examiner.*

A. GREIF, *Assistant Examiner.*